US005543950A

United States Patent [19]
Lavrentovich et al.

[11] Patent Number: 5,543,950
[45] Date of Patent: Aug. 6, 1996

[54] LIQUID CRYSTALLINE ELECTROOPTICAL DEVICE

[75] Inventors: Oleg D. Lavrentovich, Kent, Ohio; Vassil G. Nazarenko, Kiev, Ukraine

[73] Assignee: Kent State University, Kent, Ohio

[21] Appl. No.: 434,777

[22] Filed: May 4, 1995

[51] Int. Cl.$^6$ .......................... G02F 1/1337; G02F 1/137
[52] U.S. Cl. .............................. 359/77; 359/99; 359/100; 359/55; 359/84
[58] Field of Search ............................ 359/99, 100, 77, 359/55, 101, 84

[56] References Cited

U.S. PATENT DOCUMENTS

| | | |
|---|---|---|
| 4,561,726 | 12/1985 | Goodby et al. . |
| 4,564,266 | 1/1986 | Durand et al. . |
| 4,664,480 | 5/1987 | Geary et al. . |
| 4,776,674 | 10/1988 | Filas et al. . |
| 4,917,475 | 4/1990 | Meyer et al. ........................... 359/101 |
| 5,040,876 | 8/1991 | Patel et al. . |
| 5,172,257 | 12/1992 | Patel . |
| 5,422,033 | 6/1995 | Mochizuki et al. ............... 252/299.01 |

OTHER PUBLICATIONS

"Electrooptical Effert Induced by Surface Polarization in a Nematic Liquid Crystal", Zh 60, 208–211 (1990)/Sov Physc. Tech. 35, 127–129 (1990) no month.
"Surface Polarization of Domain Structures in Thin Nematic Layers", Mol. Cryst. Liq. Crystl, 192, 239–243 (1990).
"Physical mechanisms of dc switching in a liquid–crystal bistable boundary layer display", J. Appl. Phys. 56(2), 15 Jul. 1984, pp. 263–271.
P. G. de Gennes and J. Prost, The Physics of Liquid Crystals, Oxford Science Publications, Oxford, 1993 no month.
"Calculation of a Surface–Induced Polar Effect in Nematic Liquid Crystals", Physics Department Sogang University, dated 6 Aug. 1993.
"Symmetry–Breaing Effect of Interfacial Interactions on Electro–Optical Properties of Liquid Crystals", vol. 65, No. 1, 2 Jul. 1990, pp. 56 . 59.
"Surface–Polarization Electrooptic Effect in a Nematic liquid crystal", Sov. Physc. JETP 72(3), Mar. 1991, pp. 431–444.
"Dielectric Quenching of the Electric Polar Surface Instability in a Nematic Liquid Crystal", Copyrighted 1992, by The American Physical Society, pp. 45–48 No Month.
"The Mechanism of Polymer Alignment of Liquid–Crystal materials", J. Appl. Phys. 62(10), 15 Nov. 1987, pp. 4100–4108.
"Linear Flexo–Electro–Optic Effect in Hybrid Aligned Nematic Liquid Crystal Cell" J. Physique Lett. 46 (1985), pp. L–195–L–200 No Month.

*Primary Examiner*—William L. Sikes
*Assistant Examiner*—Kenneth Parker
*Attorney, Agent, or Firm*—Renner, Kenner, Greive, Bobak, Taylor & Weber

[57] ABSTRACT

An electrooptical light modulating device includes a liquid crystalline material disposed between first and second opposing cell wall structures and comprising liquid crystal of positive dielectric anisotropy. The first cell wall structure is treated with a first aligning material to homeotropically align liquid crystal molecules of the material and the second cell wall structure is treated with a second aligning material that is different from the first aligning material to homeotropically align liquid crystal molecules of the material, whereby the liquid crystal exhibits a unipolar electrooptic effect in the presence of an electric field.

8 Claims, 3 Drawing Sheets

LIQUID CRYSTALLINE ELECTROOPTICAL DEVICE

FIELD OF THE INVENTION

This invention relates to a method and apparatus in which substrates of a liquid crystal are treated to affect its optical properties, and more particularly concerns producing a unipolar electrooptical effect in a nematic liquid crystal by such treatment.

BACKGROUND OF THE INVENTION

Nematic liquid crystals are centrosymmetric media. Thus, electrooptic effects such as the dielectric Freedericksz transition are quadratic in nature (i.e., subject to the square of electric field) and as a result are nonsensitive to electric field polarity. However, nematic liquid crystals are always bounded and have surfaces at which the centrosymmetric order can be broken in which case surface polarization of the liquid crystal arises.

A homeotropic liquid crystal cell including alignment layers having identical compositions is discussed in O.D. Lavrentovich et al., "Electrooptical Effect Induced by Surface Polarization in a Nematic Liquid Crystal", Zh. Tekh. Fiz. 60, 208–211 (1990)/Sov. Phys. Tech. 35, 127–129 (1990) and O.D. Lavrentovich et al. "Surface Polarization and Domain Structures in Thin Nematic Layers", Mol. Cryst. Liq. Crystl, 192, 239–243 (1990). These articles disclose cells having two identical alignment layer coatings of silicon elastomer and cells having two identical alignment layer coatings of silicon elastomer and lecithin. In other words, both substrates are coated with the same alignment layer material. In these cells, placed between two crossed polarizers an electrooptical effect was observed, i.e., in the absence of electric field no light was transmitted, and upon application of an electric field the cell transmitted light. However, such cells do not produce a unipolar electrooptical effect, i.e., an optical instability for only one polarity of electric field.

The liquid crystalline electrooptical light modulating device of the present invention overcomes the inability of previously proposed symmetric liquid crystal systems to produce a unipolar electrooptical effect. By bounding a nematic liquid crystal by two substrates which are each treated with an identical alignment layer, as in the previously proposed liquid crystal cells, the directions of vectors representing a surface polarization "$P_s$" of the liquid crystal adjacent each substrate are antiparallel to each other. In other words, the $P_s$ vectors at one substrate point in opposite directions than the $P_s$ vectors at the other substrate. Coupling of $P_s$ with the electric field E leads to a linear contribution $(-P_sE)$ to the free energy of the system. This coupling results in a destabilizing torque of the liquid crystal at the substrate surface when the direction of the $P_s$ vectors and E are antiparallel to each other and in a stabilizing torque of the liquid crystal when $P_s$ and E are parallel to each other. In a symmetric cell with $P_s \neq 0$ there is always a destabilizing moment at one of the two plates and deformations in the optical axes of the liquid crystal arise regardless of the direction of E. Reversing the polarity of E only changes the plate at which the deformations occur and is not known to result in a unipolar electrooptical effect. Thus, a unipolar electrooptical effect is not observed when using identical alignment layer treatments.

SUMMARY OF THE INVENTION

The present invention overcomes the inability of previous proposals to produce a unipolar electrooptical effect by homeotropically aligning liquid crystal molecules with an alignment layer material on one substrate that is different from an alignment layer material on the opposing substrate. In the present device a liquid crystalline material is disposed between first and second opposing cell wall structures and includes nematic or chiral nematic liquid crystal of positive dielectric anisotropy. The first cell wall structure is treated with a first material to homeotropically align liquid crystal molecules of the cell and the second cell wall structure is treated with a second material that is different from the first material, to homeotropically align liquid crystal molecules of the cell. The liquid crystal cell so produced exhibits a unipolar electrooptical effect in the presence of an electric field. In other words, upon applying electric field of one polarity the liquid crystal cell placed between two crossed polarizers transmits light, whereas upon applying electric field of the opposite polarity substantially no light is transmitted through the liquid crystal cell placed between two crossed polarizers. These polarizers may be attached to the external surfaces of the glass plates. The illuminating light need not be polarized but rather becomes polarized after passing through the first polarizer, before entering the cell. Alternatively, one may use polarized light, e.g., a laser beam, in which case one analyzer would be used at the "exit" glass plate.

In one embodiment of the invention, by using different surface treatment materials the present light modulating device has a different absolute value of surface polarization at the first cell wall structure than at the second cell wall structure. This produces the desired unipolar electrooptical effect in that when the applied electric field is the result of a high enough voltage, distortion of the liquid crystal will occur.

In another embodiment of the invention, by using different surface treatment materials, the present light modulating device has the same surface polarization vectors near the first cell wall structure as near the second cell wall structure (i.e., parallel surface polarization). In other words, the surface polarization vectors point toward the substrate near one cell wall structure and toward the bulk of the liquid crystal near the other cell wall structure. This also produces the desired unipolar electrooptical effect.

In preferred form, the electrooptical light modulating device includes a liquid crystalline material disposed between first and second opposing cell wall structures and including liquid crystal of positive dielectric anisotropy. The first cell wall structure is treated with a first aligning material to homeotropically align liquid crystal molecules and the second cell wall structure is treated with a second aligning material that is different from the first aligning material to homeotropically align the liquid crystal molecules. Means for applying an electric field perpendicular to the cell wall structure is also included to produce the unipolar electrooptical effect. When a first electrical field of one magnitude and polarity is applied, the cell placed between two crossed polarizers is transparent to light. When a second electric field of the same magnitude as the first field but an opposite polarity is applied, the cell placed between two cross polarizers is non-transparent to polarized light.

BRIEF DESCRIPTION OF THE DRAWINGS

FIG. 3c shows a liquid crystal having the orientation of surface polarization vectors of FIG. 3a, and the effect of an electric field applied with the same polarity, but with a greater magnitude than in FIG. 3a.

DETAILED DESCRIPTION OF PREFERRED EMBODIMENTS

Figure 1:
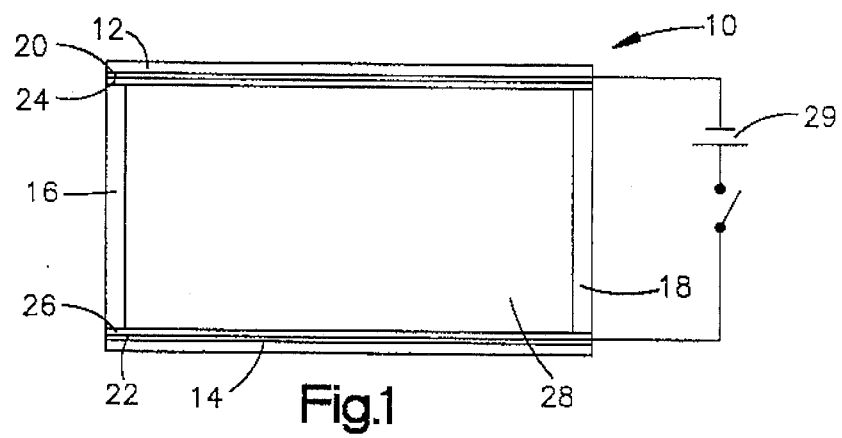
FIG. 1 is a diagrammatic view of a liquid crystal cell.

Turning now to the drawings, an electrooptical device is generally shown at 10 as including first and second opposing glass substrates 12 and 14. The substrates 12 and 14 are spaced apart by spacers 16 and 18 in the well known manner. The first substrate 12 has an electrode 20 formed thereon, and the second substrate 14 has an electrode 22 formed thereon. A first alignment layer 24 is formed on the first substrate 12 over the electrode 20, and a second alignment layer 26 is formed on the second substrate 14 over the electrode 22 in the well known manner. Liquid crystal 28 is filled in a region defined by the spacers 16 and 18, and the first and second substrates 12 and 14. A power source 29 is connected across the electrodes 20 and 22.

In all of the Figures, surface polarization $P_s$ is represented by arrows. The direction in which the arrows point depicts the direction of the surface polarization vectors and the length of the arrows depicts the magnitude of surface polarization. It should be understood that opposite orientations of the $P_s$ vectors on each substrate would occur if the locations of the different alignment layers 24 and 26 were reversed. For example, by using alignment layer 26 in FIG. 2a on the substrate 12, and using alignment layer 24 on the substrate 14, the $P_s$ vectors 30 and 32 would both point upward, in an opposite orientation than that shown in FIG. 2a.

A liquid crystal 28 comprising a nematic liquid crystal is preferably used in the present invention. The liquid crystal 28 is homeotropically aligned by alignment layers 24 and 26. This orientation of the liquid crystal molecule directors is depicted by lines 25, with parallel lines 25 representing homeotropic alignment. The lines 25 and surface polarization $P_s$ vectors 30, 32, 34 and 36 shown are only representative of the mechanisms occurring in the liquid crystal 28 and are in no way intended to limit the invention.

Although both of the alignment layers 24 and 26 function to align the liquid crystal 28 homeotropically, the alignment layers 24 and 26 may differ in their affinity for the respective ends of the liquid crystal molecules. In one embodiment, one of the alignment layers 24, 26 has an affinity for one end of the liquid crystal molecules but not the other, and the other alignment layer is just the opposite. In this way, the liquid crystal directors adjacent the alignment layers 24, 26 are aligned homeotropically with their permanent dipoles 25 uniformly aligned in the same direction, as shown in FIGS. 2a and 3a.

Within a certain range of voltages, when an applied electric field E has a polarity in the same direction as surface polarization $P_s$ vectors 30 and 32 in the liquid crystal 28 (FIG. 2a), or in the same direction as the $P_s$ vectors 36 which have a larger magnitude than other $P_s$ vectors 34 (FIG. 3a), it does not disturb the light travelling through crossed polarizers, i.e., the alignment of the liquid crystal directors 25. As a result, light will not pass through the electrooptical device 10 placed between two crossed polarizers (not shown).

When the applied electric field E has a polarity in an opposite direction than the $P_s$ vectors 30 and 32 (FIG. 2b), or in an opposite direction than the $P_s$ vectors 36 which have the larger magnitude, homeotropic alignment of the liquid crystal directors 25 is disturbed and light will pass through the electrooptical device 10 placed between two crossed polarizers. Thus, the electrooptical device 10 of the present invention is unipolar, i.e., electrooptically responsive to only one polarity of electric field E. Within a certain voltage range, light will only pass through the electrooptical device 10 if an electric field E of one polarity is used.

Figure 2A:
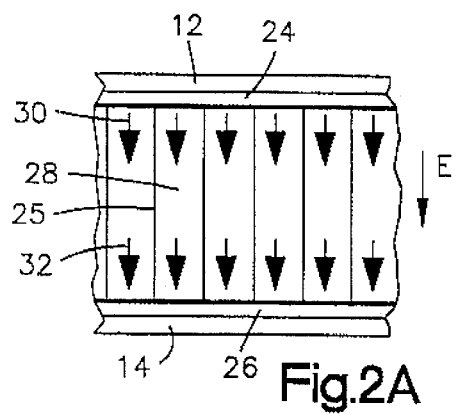
FIG. 2a is a diagrammatic view of the liquid crystal cell of FIG. 1, showing the orientation of surface polarization vectors in a homeotropically aligned liquid crystal due to different alignment layer materials, and the effect of electric field applied with a polarity in the direction of the surface polarization vectors.
Figure 2B:
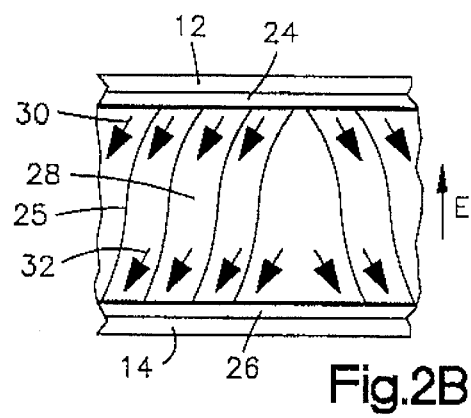
FIG. 2b shows a liquid crystal having the orientation of surface polarization vectors of FIG. 2, and the effect of electric field applied with a polarity opposite to the direction of the surface polarization vectors.
Figure 3A:
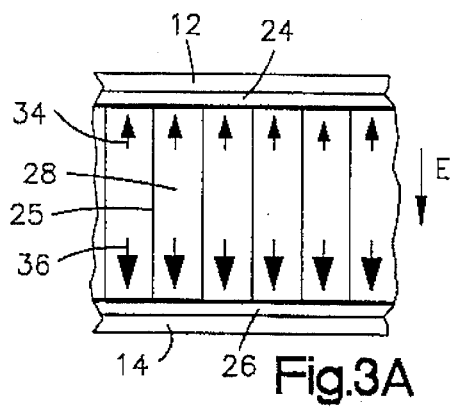
FIG. 3a is a diagrammatic view of the liquid crystal cell of FIG. 1, showing the orientation of surface polarization vectors in opposite directions with different magnitudes in a homeotropically aligned liquid crystal due to different alignment layer materials, and the effect of an electric field applied with a polarity in the direction of surface polarization vectors having the greater magnitude.

Turning to FIGS. 2a and 2b, in one embodiment the alignment layer 24 is made of a different material than the alignment layer 26 and produces parallel $P_s$ orientation, i.e., the $P_s$ vectors 30 adjacent the alignment layer 24 point in the same direction as the $P_s$ vectors 32 adjacent the alignment layer 26. The $P_s$ vectors 30 point in a direction of the bulk of the liquid crystal 28, while the $P_s$ vectors 32 point toward the alignment layer 26. Upon applying an electric field E with a polarity in the direction of the $P_s$ vectors 30 and 32, the liquid crystal directors 25 retain their homeotropic alignment without distortions. As a result, the electrooptical device 10 placed between two crossed polarizers is practically nontransparent to light.

FIG. 2b shows that by applying the same voltage as in FIG. 2a, but an electric field E having a polarity in a direction opposite to the direction of the orientation of the $P_s$ vectors 30 and 32, the homeotropic alignment of the liquid crystal directors 25 is distorted adjacent both the alignment layer 26 and the alignment layer 24. This is shown in FIG. 2b by the curvature of the lines 25. The optical axes of the liquid crystal 28 are deformed, and the electrooptical device 10 placed between two crossed polarizers is transparent to light.

Figure 3B:
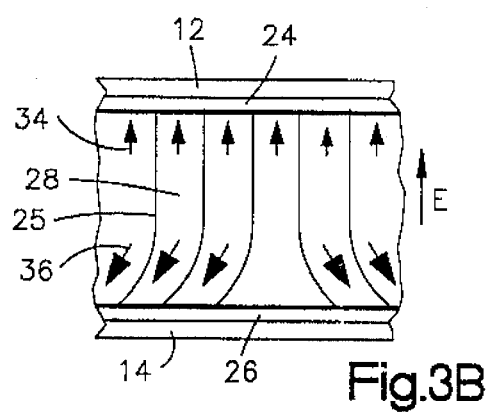
FIG. 3b shows a liquid crystal having the orientation of surface polarization vectors of FIG. 3a, and the effect of an electric field applied with the same magnitude as in FIG. 3a, but with an opposite polarity.
Figure 3C:
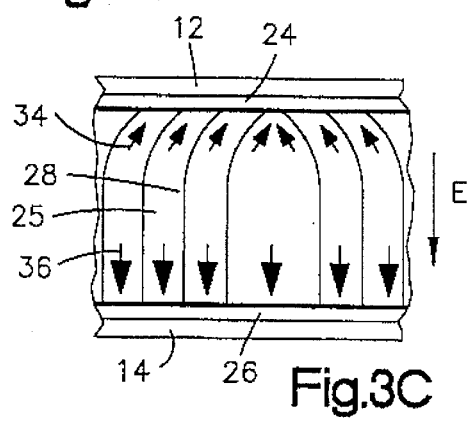

FIGS. 3a–3c relate to another embodiment of the invention and show the first $P_s$ vectors 34 pointing in an opposite direction (i.e., antiparallel) with respect to the second $P_s$ vectors 36. The magnitude of the first $P_s$ vectors 34 is less than that of the second $P_s$ vectors 36, as shown by the smaller length of the arrows of the $P_s$ vectors 34. The location of the $P_s$ vectors 34 and 36 could be reversed by switching the location of the alignment layers 24 and 26, and still produce the same unipolar electrooptical effect, as long as E is applied in the opposite direction. In FIG. 3a, one alignment layer 24 produces a relatively small magnitude of the $P_s$ vectors 34. Another, different alignment layer 26 produces a magnitude of the $P_s$ vectors 36 larger than that produced by the alignment layer 24. The electric field E is applied to have its polarity in a direction of the second, larger $P_s$ vectors 36. Upon applying the electric field E, the liquid crystal 28 retains its homeotropic alignment, as shown by the parallel lines of the liquid crystal directors 25, and is practically non-transparent to light which passes through the cell and two crossed polarizers.

In FIG. 3b, an electric field E is applied such that its polarity is opposite to that in FIG. 3a. This distorts the homeotropic alignment of the liquid crystal directors 25 adjacent the alignment layer 26 as shown by the curvature in the lines 25. As in FIG. 2b, the optical axes of the liquid crystal 28 are deformed, and the liquid crystal 28 is transparent to polarized light.

FIG. 3c shows the effect of applying an electric field E with a polarity in the same direction as in FIG. 3a, but at a higher voltage. The greater magnitude of electric field E is depicted by the larger length of the associated arrow, compared to FIGS. 3a and 3b. Application of electric field E at higher voltage distorts the homeotropic orientation of the liquid crystal directors 25 adjacent the alignment layer 24, as shown by the curvature of the lines 25. The optical axes of the cell 28 are deformed, and the cell 28 placed between two crossed polarizers is transparent to light.

In another embodiment, the unipolar electrooptical response of the invention is enhanced by changing the composition of the liquid crystal 28. The operation voltage threshold of the optical diode can be reduced by adding a chiral dopant to a nematic liquid crystal material to produce a helical twist of the liquid crystal directors. The dielectric anisotropy of the resulting cholesteric liquid crystal is positive. A cholesteric liquid crystal placed between two plates with homeotropic alignment materials orients in such a manner that the helical axis is parallel to the plates. When the cell is thin enough, e.g. smaller than the pitch of helical twist, the homeotropic anchoring unwinds the helix and one observes uniform homeotropic texture. In this case the tendency of the material to form a helix is suppressed by the anchoring at the surface of the plates. When an external DC or low-frequency AC field is applied, the liquid crystal directors deviate at one of the plates, as discussed above for usual nematic structure. The destabilizing torque of the field is enhanced by the tendency of the material to form a helix and, as a result, the threshold voltage is smaller than for the same material without chiral dopants.

Preferable materials for the liquid crystal 28 in the present invention include pentylcyanobiphenyl (K15, EM Industries), octylcyanobiphenyl (K24, EM Industries), and the commercial mixture E7 (EM Industries). Other types of liquid crystals may also be used as known to those skilled in the art. Chiral dopants such as CE1, which has the chemical formula R—$C_6H_4$—$C_6H_4$—COO—$C_6H_4$—CN, where the chiral part is R=$CH_3CH_2CH(CH_3)CH_2$, or CE2, which has the chemical formula R—$C_6H_4$—$C_6H_4$—COO—$C_6H_4$—R, where the chiral part is R=$CH_3CH_2CH(CH_3)CH_2$, may be added to K15. Other suitable chiral dopants and cholesteric liquid crystals would be known to those skilled in the art in view of this disclosure.

Preferable materials for the alignment layers 24 and 26 include the following: silicon elastomer (0.5–0.8% by weight in hexane), OTS (1.0–1.2% by weight in hexane), DMOAP (0.1–0.2% by weight in methanol), and lecithin (0.10–15% by weight in hexane). Other materials that may be used as homeotropic alignment layers include: hexadecyltrimethylammonium bromide, N-perfluoroctylsulphonyl-3-aminopropyltrimethyl-ammonium iodide, alkylmonoamines, tetrachloro-μ-hedroxo-μ-carboxylatodichromium complexes, n-octadecyltrimethoxysilane (ODES), pentyltriethoxysilane (PES), N-methyl-3-aminopropyl-trimethoxysilane (MAP), N-β(aminoethyl)γ-aminopropyl-trimethoxysilane (AAMS), γ-aminopropyl-triethoxysilane (AES), and oxides such as $Al_2O_3$ and $In_2O_3$. Other suitable homeotropic coating materials would be known to those of ordinary skill in the art in view of this disclosure.

In a preferred embodiment, OTS and SE are used as the alignment layers for a 5CB molecule [$C_5H_{11}(C_6H_4)_2CN$]. The distribution of charges in the 5CB molecule gives rise to a permanent dipole moment μ=4.3D directed practically parallel to the long axis (from atom N to atom C) of the molecule and, consequently, perpendicular to the cell electrodes when homeotropically aligned. An important feature of the 5CB molecule is its biphilic nature and capability of assuming different orientations on hydrophilic and hydrophobic surfaces. The silicon elastomer/5CB interface has strong surface polarization ranging from $5 \times 10^{-3}$ cgs to $6 \times 10^{-3}$ cgs directed outward of the elastomer substrate. In contrast, an OTS-coated substrate has a layer of long alkane chains and opposite orientation of the 5CB molecules and their dipoles may result since now the orientation of the hydrophobic tails toward the substrate is preferable.

While not wanting to be bound by theory, the very nature of symmetry breaking at the surface implies two possibilities: $P_s$ vectors can be pointed either toward the substrate or toward the liquid crystal bulk. For example, if $P_s$ is created by permanent dipole moments of the liquid crystal molecules, the direction of the polarization is dictated by the treated substrate affinity for the heads and tails of the nematic molecules. Thus, by using two different substrates or plates one can construct a cell where the directors 25 of the liquid crystal molecules are normal to the plates (homeotropic anchoring) and the directions of the two surface polarizations are parallel to each other (FIG. 2a). When an electric field E is applied along that direction, no instability of the homeotropic alignment of the liquid crystal 28 occurs. For the opposite electric field direction (FIG. 2b) the liquid crystal molecules 25 adjacent the alignment layers 24 and 26 deviate to decrease the coupling energy ($-P_sE$), It is expected that alignment layers 24, 26 composed of OTS, lecithin or DMOAP will orient the tails of the liquid crystal molecules 25 toward the substrates. Thus, OTS, lecithin or DMOAP could be used with an alignment material such as SE or the like which orients the heads of the liquid crystal molecules toward the substrates.

However, the invention is not restricted to parallel orientation of $P_s$. The cell will function as an electrooptical diode even when both alignment layers 24, 26 have a similar affinity for heads and tails of the liquid crystal molecules. For example, even when the alignment layers 24 and 26 have the same affinity for the liquid crystal molecules and antiparallel orientation of the $P_s$ vectors 34 and 36 occurs (FIGS. 3a–3c), the absolute values of the $P_s$ vectors 34 and 36 can be made to be different, by using different alignment materials. Such differences in magnitude of the $P_s$ vectors 34 and 36 also produces a unipolar electrooptical effect within certain voltage ranges.

In FIGS. 3a–3c, the $P_s$ vectors 34 are antiparallel with respect to the $P_s$ vectors 36. Both the alignment layer 24 and the alignment layer 26 attract liquid crystal molecule heads. In the vicinity of the alignment layers 24 and 26 the molecular dipoles orient themselves in a ferroelectric manner because of different affinity of the heads and tails of the molecules to the alignment layers 24, 26. Thus, the direction of surface polarization vectors in this and in the other embodiments is the same as that of the molecular dipoles. However, the absolute value of the $P_s$ vectors 34 adjacent the alignment layer 24 is relatively small, while the absolute value of the $P_s$ vectors 36 adjacent the alignment layer 26 is larger. This arrangement can result, e.g., from the fact that the alignment layer 24 attracts a smaller percentage of liquid crystal molecules than the alignment layer 26.

Upon applying an electric field E with a polarity in a direction of the smaller $P_s$ vectors 34 (FIG. 3b), deviations in the liquid crystal directors 25 occur adjacent the alignment material 26, i.e., a surface instability or surface tilt of the directors 25 results. By reversing the polarity of the electric field E so that it is in the direction of the $P_s$ vectors 36 (FIG. 3a), the small magnitude of the $P_s$ vectors 34 at the alignment layer 24 does not allow instability of the liquid crystal directors 25 to occur adjacent the alignment layer 24. Only when the applied electric field E is sufficiently large is the alignment layer 24 switched on, i.e., the liquid crystal directors 25 adjacent the alignment layer 24 are distorted (FIG. 3c). Therefore, there is a range of voltages where the electrooptical response is unipolar even when the two $P_s$ vectors 34 and 36 are oriented alike, i.e., antiparallel so as to point either toward or away from the alignment layers. However, when the $P_s$ vectors are opposite in sign, i.e., parallel, the unipolarity of the electrooptical effect is most evident.

Again, while not wanting to be bound by theory, the following surmises why a unipolar electrooptical effect occurs when surface polarizations at the two alignment layers have different absolute values and are antiparallel (FIGS. 3a–3c). For a homeotropic liquid crystal cell having positive dielectric anisotropy $\epsilon_a > 0$, in a vertical DC electric field, $P_{s,1}$ is the surface polarization at the lower plate 14 and $P_{s,2}$ is the surface polarization at the upper plate 12. There are two basic possibilities for the $P_s$ vector orientation. Either it is pointed in the direction of the substrate or in the opposite direction toward the nematic bulk. However, the absolute value of the polarization might take on any value. When the DC field is applied to the cell, a surface instability (i.e., a surface tilt of the director) is expected when at one or both plates the surface polarization is oriented antiparallel to the field.

To model this situation quantitatively, the torque balance equation, in approximation of a small surface tilt $\theta_s$, is considered. The forces that prevent instability are dielectric force, elastic force, and anchoring force. The orientation of the director n in the central bulk region is fixed along the z axis because of a strong dielectric response of the nematic bulk. A surface tilt $\theta$ (deviation of n from the normal to the plate) will quickly relax in the bulk [M. Monkade, Ph. Martinot-Lagarde and G. Durand, Europhys. Lett. 2, 299 (1986)]: $\theta(z)=\theta_s \exp(-z/\xi)$. Here, $\xi=(4\pi K/\epsilon_a E^2)^{1/2}$ and is a dielectric coherence length, z is the distance from the plate, $\theta_s$ is a maximum tilt at the surface, and K is a bend elastic constant. Thus, for $\xi<d$, two plates can be considered as independent. The stabilizing dielectric torque is $K\theta_s/\xi$ [M. Monkade, Ph. Martinot-Lagarde and G. Durand, Europhys. Lett. 2, 299 (1986)].

The surface anchoring results in torque $W\theta_s$, where W is the anchoring coefficient. Bulk curvature elasticity also stabilizes initial homeotropic orientation. However, for $\xi<d$ the elastic torque is smaller than the dielectric torque and thus can be disregarded in the total balance of torques when quantatively considering the instability mechanism.

There are two destabilizing mechanisms. First, the surface polarization torque $\pm |P_s|E\theta_s$ is destabilizing when $P_s$ and E are antiparallel and is stabilizing when $P_s$ is parallel to E. The second destabilizing torque mechanism can arise due to the so-called flexoelectric effect. This effect consists of the appearance of an electric polarization $P_f$ as a result of curvature distortions, $\sim n\nabla n$. A surface tilt creates a flexopolarization $P_f$ and results in the destabilizing torque $(-eE)\theta_s$ at the lower plate if $e>0$ and the field is along the positive direction of the vertical z axis. Here, $e=e_1+e_3$, $e_1$ and $e_3$ are the flexoelectric coefficients in usual notations. Thus, the surface torque equation for the lower plate reads:

$$(K/\xi + W_1 - eE + P_{s1}E)\theta_{s1} = 0, \qquad (1)$$

and for the upper plate as:

$$(K/\xi + W_2 + eE + P_{s2}E)\theta_{s2} = 0. \qquad (2)$$

The quantities E and $P_s$ are positive when the vectors E and $P_s$ are parallel to the z axis and negative when E and $P_s$ are oriented in the opposite direction. As was already mentioned, the subscripts "1" and "2" refer to the lower plate 14 and upper plate 12, respectively.

Eqs. (1) and (2) result in the thresholds of the surface instabilities:

$$E_{th,1} = \frac{W_1}{e - P_{s,1} \mp (\epsilon_a K/4\pi)^{1/2}}, \qquad (3)$$

$$E_{th,2} = \frac{W_2}{-e - P_{s,2} \mp (\epsilon_a K/4\pi)^{1/2}}, \qquad (4)$$

where the sign "−" should be taken for $E>0$ (vector E is along the positive direction of the Z-axis) and the sign "+" for $E<0$. A simple analysis of Eqs. (3) and (4) shows that the unipolar electrooptical effect in a nematic cell can occur at one plate when $P_{s,1} < e - (\epsilon_a K/4\pi)^{1/2}$ and at $P_{s,2} < -e + (\epsilon_a K/4\pi)^{1/2}$, and at both plates (however, with different thresholds) when $P_{s,1} < e - (\epsilon_a K/4\pi)^{1/2}$ and $P_{s,2} < -e - (\epsilon_a K/4\pi)^{1/2}$. To get the unipolar effect, therefore, one does not generally need parallel $P_{s,1}$ and $P_{s,2}$. Even with antiparallel $P_{s,1}$ and $P_{s,2}$, there is a gap in the electric field $|E_{th,1}| < |E| < |E_{th,2}|$, or $|E_{th,2}| < |E| < |E_{th,1}|$, where the instability occurs only for one polarity of the field, if the absolute values of $P_{s,1}$ and $P_{s,2}$ are different.

Besides the "head-tail" and magnitude-related surface polarization mechanisms discussed above, there is another source of surface polarization $P_s$: ion impurities in the cell leading to electric double layers located near the electrodes. Even when the "head-tail" mechanism does not work for some materials, the optical diode effect might still exist because of these electric double layers. The electric double layers occur as a result of spatial separation of positive and negative ions in the vicinity of the plates. This spatial separation creates electric polarization normal to the plates. The direction of this surface polarization is not necessarily the same as the direction of molecular dipoles. The role of ions in the electrooptical performance of liquid crystal cells is not well-known. Our experiments indicate that when there are no molecular dipoles in the liquid crystal, the ions alone do not produce an optical-diode effect. We have used nematic liquid crystal with "head-tail" symmetrical molecules; these molecules have no molecular dipoles. However, there were some ions in the system, and, supposedly, some surface polarization caused by these ions. The cell did not respond to the external field at all. This means that the polarization caused by the ions does not play a dominant role in the effect. Nonetheless, the ionic polarization can influence the performance of the cells where the optical-diode effect is caused by the molecular-dipolar mechanism.

EXAMPLE 1

The specific parameters and conditions provided in these examples are illustrative only and are not intended to limit the scope of the invention unless otherwise stated. The liquid crystal cell was composed of two flat plates. These plates were each coated with a different material that provided homeotropic alignment of the liquid crystal molecules.

Glass slides coated with indium tin oxide (ITO) were purchased from Donnelly Applied Films Corp., Boulder, Colo., and cut to a size of approximately 1 cm×2 cm.

The glass plates were cleaned by washing in an ultrasound detergent bath for 30 minutes, rinsing in deionized water for 5 minutes, washing in concentrated sulphuric acid for 1 minute, rinsing in deionized water for 5 minutes, and drying in a drier at approximately 115° C.

Two different solutions were used to provide an orienting (homeotropic) coating on the two plates. The first was a solution of 0.7% by weight of silicon elastomer $(CH_3)_3SiO[(CH_3)_2SiO]_nSi(CH_3)_3$ (SE), n≈25,000 in hexane. The second was a solution of 1.1% by weight of octadecyltrichlorosilane $[C_{18}H_{37}Si^+3(Cl^{31})_3]$ (OTS) in hexane.

The first plate was dipped in the SE solution for 5 minutes and then slowly removed from the solution at a rate of 1 cm/5 seconds. The plate was dried for one hour at 185° C. To cover the second plate, a droplet of the OTS solution was spun onto the ITO-coated surface of the plate. Then the plate was baked for 1 hour at 160° C.

The liquid crystal cell was composed of the two plates coated as described above, and separated by mylar films having a thickness of 36 µm. The OTS coated surface faced the SE-coated surface. The cell was filled by capillary action with liquid crystal K15 (pentylcyanobiphenyl, 5CB purchased from EM Industries) in the isotropic phase at 38°–40° C., and was then cooled slowly at a rate of 0.5° C./min through the isotropic-nematic transition to room temperature (approximately 20° C). The edges of the cell were sealed by an epoxy sealant. Observations under a polarizing microscope were taken to control the quality of the liquid crystal alignment. It was found that the liquid crystal director was oriented homeotropically.

A DC electric field was applied to the ITO electrodes of the cell. One polarity of the field (3.3 V with "−" at the SE-coated electrode) caused deformations of the liquid crystal director and the optical axis. It was shown experimentally that in such case rounded domains appeared and the cell placed between two crossed polarizers was transparent for polarized light. For an electric field of the opposite polarity (3.3 V with "+" at the SE-coated electrode) the cell retained the homeotropic orientation and was practically non-transparent between two polarizers. The threshold voltage of the domain instability was 1.4 V for a cell of 36 µm thickness (and 1.8 V for a cell of 51 µm thickness).

To characterize the performance of the cell quantitatively, the cell was placed between two polarizers and the transmittance of a He—Ne laser beam was studied. The contrast ratio was defined as (Imax−Imin/Imax)×100% ≈80%, where Imax is the maximum light intensity measured using a photodiode for a negative polarity of the electric field (−3.4 V) and Imin is the intensity measured for the positive polarity of the electric field (+3.4 V). The switch-on time (DC pulse of negative polarity applied) was 0.25 seconds, and the switch-off time was 3 seconds (DC pulse of positive polarity applied).

To reduce the response times, the scheme of simultaneous DC and AC (20kHz, 7.5 V) action was used. A DC pulse of negative polarity (−4.5 V) was applied continuously. AC pulses served to trigger the cell from the homeotropic state (AC "on") to the transparent state (AC "off"). When the AC pulse of 7.5 V was on, the molecules of the liquid crystal aligned along the AC field because of the positive dielectric anisotropy of the liquid crystal material. The switch-on time was 25 msec and the switch-off time was 30 msec.

EXAMPLE 2

The following example describes a liquid crystal optical diode in which the liquid crystal cell was composed of two separated flat plates coated with two different materials that provide homeotropic alignment of the liquid crystal directors. This example is similar to Example 1, with the difference residing in the homeotropic coating materials used.

Glass slides coated with indium tin oxide (ITO) were prepared and cleaned as described in Example 1.Two different types of solutions were used to provide an orienting (homeotropic) coating of the two plates. The first was a 0.15% (by weight) solution of DMOAP in methanol. The second was a 1.1% (by weight) solution of octadecyltrichlorosilane $[C_{18}H_{37}Si_3+(Cl^-)_3](OTS)$ in hexane. These two materials were believed to provide the same direction of the molecular dipoles with respect to the cell plates. However, the resulting magnitude of the surface polarizations may be different. This should lead to a unipolar electrooptic effect within some range of the applied voltages, which was confirmed experimentally.

The liquid crystal cell was compared to the two plates coated as described above and separated by mylar films with a thickness of 23 µm. The OTS-coated surface faced the DMOAP-coated surface. The cell was filled by capillary action with liquid crystal K15 (pentylcyanobiphenyl, 5CB, purchased from EM Industries) in the isotropic phase at 38°–40° C. and then was cooled slowly at 0.5° C./min. through the isotropic-nematic transition to room temperature (approximately 20° C.). The edges of the cell were sealed by an epoxy sealant. Observations under a polarizing microscope revealed that the liquid crystal directors were oriented homeotropically.

Figure 4:
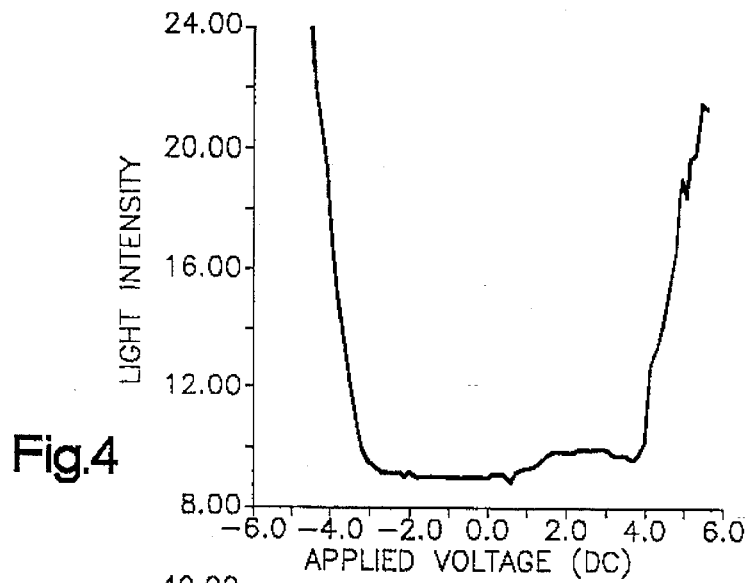
FIG. 4 is an Intensity v. Voltage curve for a pure nematic liquid crystal cell exhibiting the unipolar electrooptical effect.

A DC electric field was applied to the ITO electrodes of the cell. As shown in FIG. 4, the field caused deformations of the optical axis, and the cell became transparent. As applied voltage is increased, the intensity of the light transmitted through the polarizer, cell and analyzer and measured by the photodiode attached to the microscope, also increased. The effect strongly depended on the polarity of the applied field: positive and negative polarities of the applied voltages lead to different intensity of the light transmitted by the cell. The unipolar character of the effect was especially pronounced when the voltage was in the range |U|<4V.

EXAMPLE 3

The following example describes a liquid crystal optical diode in which the liquid crystal material was chiral nematic liquid crystal.

The optical diode cell was prepared from two plates with SE and OTS (as in Example 1). The plates were separated by mylar films with a thickness of 23 μm. The OTS-coated surface faced the SE-coated surface.

The liquid crystal material was prepared as a mixture of K15 (nonchiral nematic material) and chiral dopant CE1 with the chemical formula R—$C_6H_4$—$C_6H_4$—COO—$C_6H_4$—CN, where the chiral part is R=$CH_3CH_2CH(CH_3)CH_2$. The material in its pure form melts into the cholesteric phase at 99.5° C., and at 195.9° C. the cholesteric phase transforms into the isotropic phase. The weight ratio of the mixture CE1:K15 was 1:700.

The cell was filled by capillary action with the K15:CE1 mixture in the isotropic phase at 38°–40° C. and then was cooled slowly at 0.5° C./min. through the isotropic-nematic transition to room temperature (approximately 20° C.). The edges of the cell were sealed by an epoxy sealant. Observations under a polarizing microscope were taken to control the quality of the liquid crystal alignment. It was found that the liquid crystal directors were oriented homeotropically.

Figure 5:
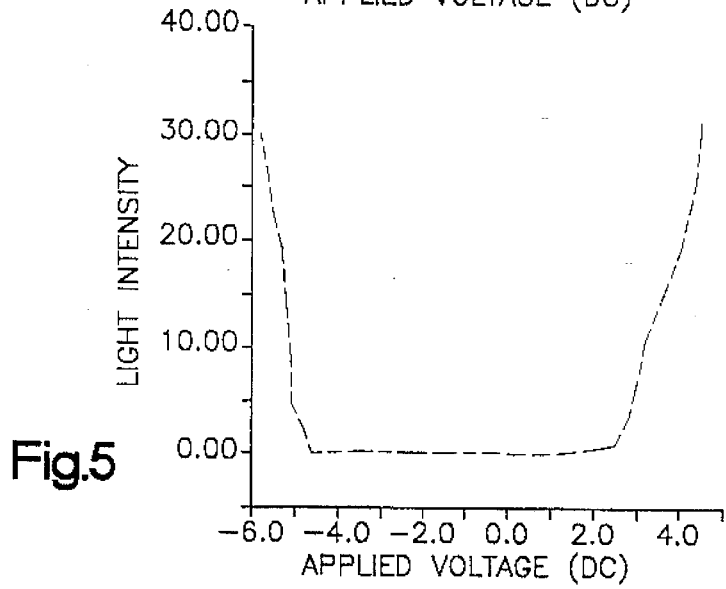
FIG. 5 is an Intensity v. Voltage curve for a chiral doped nematic liquid crystal exhibiting the unipolar electrooptical effect.
Figure 6:
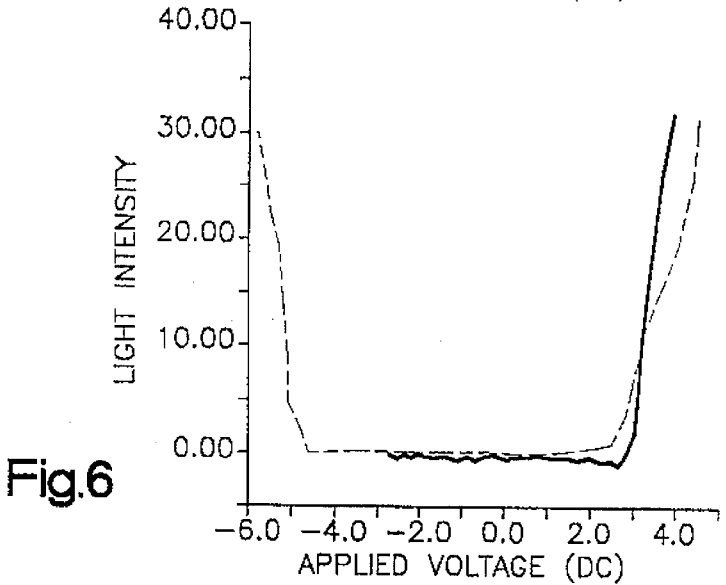
FIG. 6 is an Intensity v. Voltage curve comparing the chiral doped nematic liquid crystal of FIG. 5, shown by dotted lines, to a similarly prepared pure nematic liquid crystal, shown by a solid line, and showing a decreased threshold field for the chiral doped nematic liquid crystal.

A DC electric field was applied to the ITO electrodes of the cell. FIG. 5 shows that when the field increased to some threshold value, the light intensity transmitted through the polarizers and the cell started to increase. The effect had unipolar character U when the applied voltage absolute value was within the range 2.5<|U|4.7. The performance of this chiral-nematic-filled optical diode was compared with the pure K15 cell (FIG. 6) of the same thickness composed of the same plates. As is clear from FIG. 6, the chiral dopant leads to some decrease of the threshold field and to a change in the slope of an Intensity v. Voltage curve. The last circumstance can be used when tuning of the light intensity passing through the cell is needed.

EXAMPLE 4

The following example describes a liquid crystal optical diode in which the liquid crystal material was a chiral nematic liquid crystal. The optical diode cell was prepared from two plates coated with SE and lecithin. The plates were separated by mylar films with a thickness of 36 μm.

The liquid crystal material was prepared as a mixture of K15 and chiral dopant CE2 with chemical formula R—$C_6H_4$—$C_6H_4$—COO—$C_6H_4$—R, where the chiral part is R=$CH_3CH_2CH(CH_3)CH_2$. The weight ratio of the mixture CE2:K15 was 1:600.

The cell was filled by capillary action with the chiral K15:CE2 mixture in the isotropic phase at a temperature of 40°–42° degrees C., and then was cooled slowly at 0.5° C./min. through the isotropic-nematic transition to room temperature (approximately 20 degrees C.). The edges of the cell were sealed by an epoxy sealant.

A reference cell was constructed in the same manner but filled with pure K15 to compare the performance of the K15:CE2 mixture with pure K15. Observations under a polarizing microscope were taken to control the quantity of the homeotropic liquid crystal alignment in both cells.

Figure 7:
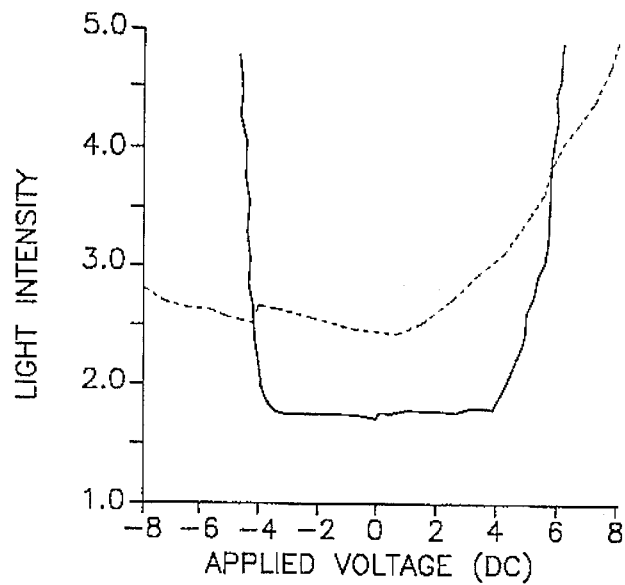
FIG. 7 is an Intensity v. Voltage curve comparing a pure nematic liquid crystal, shown by a solid line, with CE2 chiral doped liquid crystal, shown by dotted lines, showing decreased threshold field for the chiral doped nematic liquid crystal.

A DC electric field was applied to the ITO electrodes of the cell. FIG. 7 shows that the presence of chiral material significantly reduced the threshold voltage of optical response: for positive voltage, the light transmittance started to increase at +0.5V for the K15:CE2 cell and only at +3.8V for the pure K15 cell. The slope of an Intensity vs. Voltage curve was also influenced. The last effect can be used when the tuning of the light intensity passing through the cell is needed. For negative voltages, there was an undesirable increase of the intensity; however, this increase was rather small in comparison with the positive-voltage part of the curve and the whole electrooptical characteristic still preserved clear unipolar character. The last circumstance can be used when the tuning of the light intensity passing through the cell is needed.

EXAMPLE 5

This example is similar to the basis Example 1 for pure nematic material K15. The difference is in the homeotropic coating material used. Glass slides coated with indium tin oxide (ITO) were prepared and cleaned as described in the Example 1.

Two different types of solutions were used to provide an orienting (homeotropic) coating of the two plates. The first was 0.15% by weight solution of DMOAP in methanol. The second was a solution of silicone elastomers (SE) as described in Example 1. These two materials are believed to provide different directions of the molecular dipoles with respect to the cell plates. The resulting value and direction of the surface polarization at the two plates is expected to be different. The last difference should lead to a unipolar electrooptic effect within some range of applied voltages and was confirmed experimentally.

The cell was composed of the two plates coated as described above and separated by mylar films with a thickness of 36 μm. The cell was filled by capillary action with K15 at a temperature of 40°–43° degrees C., and then was cooled slowly at 0.5° C./min through the isotropic-nematic transition to room temperature (approximately 20 degrees C.). The edges of the cell were sealed by an epoxy sealant. Observations under the polarizing microscope revealed that the liquid crystal director was oriented homeotropically.

A DC electric field was applied to the ITO electrodes of the cell. The intensity of the light transmitted through the polarizer, cell and analyzer and measured by a photodiode attached to the microscope, increased with the applied positive voltages, starting a U=+2.0 V. The effect was unipolar: negative voltages up to (−3.0)V did not result in the transmittance increase.

EXAMPLE 6

Figure 8:
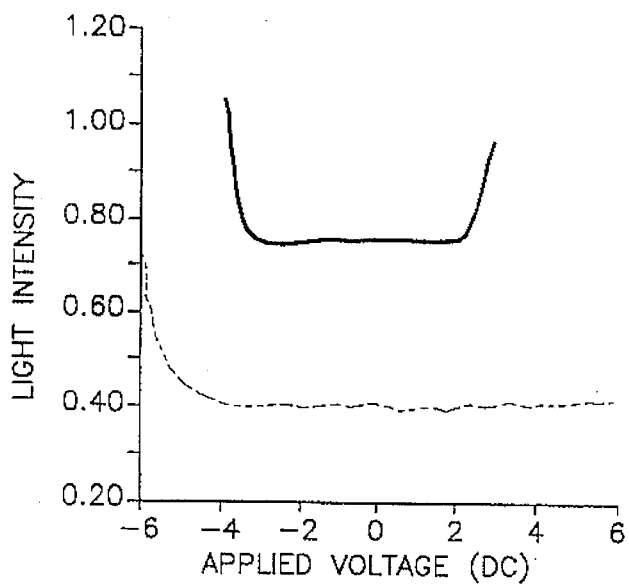
FIG. 8 is an Intensity v. Voltage curve comparing a pure nematic liquid crystal, shown by a solid line, with a CE1 chiral doped nematic liquid crystal, shown by dotted lines, showing increased threshold field for the chiral doped nematic liquid crystal.

This example is similar to Example 5, the difference being the liquid crystal material used. Instead of pure K15, a chiral mixture K15:CE1 was used. The cells were prepared as described in Example 5. The chiral mixture K15:CE1 was prepared as described in Example 3. FIG. 8 shows that the chiral dopant CE1 increased the threshold field and also reversed the polarity of the unipolar effect. The physical mechanism of this effect might be connected to the fact that chiral polar molecules of CE1 destroy the surface polarization layers at the cell plates. Comparative Examples 1–3 provide experimental support for the absence of a unipolar electrooptical effect in a symmetric cell, i.e., one having identical alignment layer materials on each substrate.

COMPARATIVE EXAMPLE 1

Glass slides with an ITO conducting layer were cleaned as described in Example 1 and coated with a 0.7% (by weight) solution of silicon elastomer $(CH_3)_3SiO[(CH_3)_2SiO]_n Si(CH_3)_3$, n~25,000 (SE) in hexane.

The liquid crystal cell was composed of the two plates coated with SE and separated by mylar films with a thickness of 36 µm. The cell was filled by capillary action with liquid crystal K15 (pentylcyanobiphenyl, 5CB, purchased from EM Industries) in the isotropic phase at 38°–40° C. and then was cooled slowly at 0.5° C./min. through the isotropic-nematic transition to room temperature (approximately 20° C.). The edges of the cell were sealed by an epoxy sealant. Observations under a polarizing microscope revealed that the liquid crystal directors were oriented homeotropically.

A DC electric field was applied to the ITO electrodes of the cell. Both polarities of the field caused deformations of the optical axis. Rounded domains appeared and the cell became transparent for the polarized light. The light transmittance depended only on the absolute value of the voltage but not on the polarity of the applied field. Also, the voltage threshold did not depend on the polarity of the applied field. Therefore, the symmetric cell with both plates coated by SE did not produce the unipolar electrooptical effect.

COMPARATIVE EXAMPLE 2

Glass slides with ITO conducting layers were cleaned as above and coated with a 0.1% (by weight) solution of lecithin in ethanol. The liquid crystal cell was composed of the two plates coated with a 0.1% (by weight) solution of lecithin in hexane. The plates were separated by mylar films with a thickness of 36 µm. The cell was filled by capillary action with liquid crystal K15 (pentylcyanobiphenyl, 5CB, purchased from EM Industries) in the isotropic phase at 38°–40° C. and then was cooled slowly at 0.5° C./min through the isotropic-nematic transition to room temperature (approximately 20° C.). The edges of the cell were sealed by an epoxy sealant.

Observations revealed the same features as described above for the SE coated cell. Under the polarizing microscope the liquid crystal directors were oriented initially homeotropically; any polarity of the external field caused deformations of the optical axis. The light transmittance depended only on the absolute value of the voltage but not on the polarity of the applied field. Therefore, the symmetric cell coated with lecithin did not produce the unipolar electrooptical effect.

COMPARATIVE EXAMPLE 3

Glass slides with an ITO conducting layer were cleaned as described in Example 1 and coated with a 0.15% (by weight) solution of DMOAP in methanol. The cell was assembled after drying in the solvent. The liquid crystal cell was composed of the two plates coated with DMOAP and separated by mylar films with a thickness of 23 µm. The cell was filled by capillary action with liquid crystal K15 in the isotropic phase. The edges of the cell were sealed by an epoxy sealant. Observations under a polarizing microscope revealed that the liquid crystal directors were oriented homeotropically.

Figure 9:
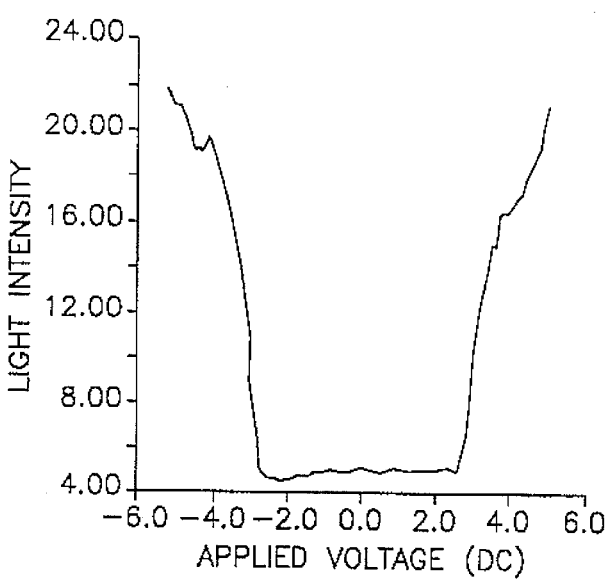
FIG. 9 is an Intensity v. Voltage curve for a symmetrical nematic liquid crystal which does not exhibit the unipolar electrooptical effect.

A DC electric field was applied to the ITO electrodes of the cell. As shown in FIG. 9, both polarities of the field caused deformations of the optical axis. The light transmittance depended only on the absolute value of the voltage but not on the polarity of the applied field. Also, the voltage threshold did not depend on the polarity of the applied field. Therefore, the symmetric cell with both plates coated by DMOAP did not produce the unipolar electrooptical effect.

Advantages of the present electrooptical diode include the unipolar response of the liquid crystal to the applied electric field. Moreover, the cells work as low-voltage displays (the voltage required to operate the cell might be less than 2 V), and there is no necessity to use materials with high dielectric anisotropy. The threshold of the unipolar effect is small, on the order of $10^2–10^3$ V/cm. Thus, a cell with a thickness of 20–50 µm can be operated by 1–5 V. Another advantage of the present cell is that it is easy to manufacture because the cell gap or the distance between the substrates is rather thick (eg., 20–50 µm). Therefore, problems of electrical shortcuts and of the plates' parallelism are unimportant for the cell. This leads to a higher yield. Manufacturing is further simplified because making the inventive diode does not require rubbing the alignment layers or creating any unidirectional alignment in the plane of the substrate. The cell can also be used in logistic schemes and as an optical processing device.

What is claimed is:

1. An electrooptical light modulating device comprising a liquid crystalline material disposed between first and second opposing cell wall structures and comprising liquid crystal of positive dielectric anisotropy,
wherein said first cell wall structure is treated with a first aligning material to homeotropically align liquid crystal molecules of the material and said second cell wall structure is treated with a second aligning material that is different from said first aligning material to homeotropically align liquid crystal molecules of the material, whereby said liquid crystal exhibits a unipolar electrooptic effect in the presence of an electric field.

2. The light modulating device of claim 1, wherein an absolute value of surface polarization of said liquid crystal at said first cell wall structure is different from an absolute value of surface polarization of said liquid crystal at said second cell wall structure.

3. The light modulating device of claim 1, wherein vectors of surface polarization at said first cell wall structure are in the same direction as vectors of surface polarization at said second cell wall structure.

4. The light modulating device of claim 1, wherein the first aligning material consists of silicone elastomer and the second aligning material is selected from the group consisting of octadecyltrichlorosilane, lecithin, and dimethlyoctadecylaminopropyltrimethoxysilylchloride.

5. The light modulating device of claim 1, wherein the liquid crystal is a nematic or cholesteric liquid crystal.

6. The light modulating device of claim 1, further comprising means for applying an electric field perpendicular to said cell wall structures such that when a first electric field of one magnitude and polarity is applied, the liquid crystal is transparent, and when a second electric field of the same magnitude as the first field but an opposite polarity is applied, the liquid crystal is nontransparent.

7. The light modulating device of claim 6, further comprising two crossed polarizers between which the liquid crystal is disposed.

8. The light modulating device of claim 6, further comprising an analyzer, whereby incoming polarized light passes through the liquid crystal and the analyzer.

* * * * *

UNITED STATES PATENT AND TRADEMARK OFFICE
CERTIFICATE OF CORRECTION

PATENT NO : 5,543,950
DATED : August 6, 1996
INVENTOR(S) : Oleg D. Lavrentovich et al.

It is certified that error appears in the above-identified patent and that said Letters Patent is hereby corrected as shown below:

Insert the following paragraph at column 1, line 4:

---The United States government has a paid-up license in this invention and may have the right in limited circumstances to require the patent owner to license others on reasonable terms as provided for by the terms of contracts DMR89-20147, awarded by the National Science Foundation, and MDA972-90-C-0037(NCIPT), awarded by Defense Advanced Research Projects Agency.---

Signed and Sealed this

Twenty-ninth Day of December, 1998

*Attest:*

BRUCE LEHMAN

*Attesting Officer*      *Commissioner of Patents and Trademarks*